United States Patent [19]

Bertanza

[11] 4,069,743

[45] Jan. 24, 1978

[54] CONTROL UNITS FOR VEHICLE POWERSTEERING MECHANISMS

[75] Inventor: Battista Bertanza, Segrate (Milan), Italy

[73] Assignee: Riva Calzoni S.p.A., Milan, Italy

[21] Appl. No.: 702,678

[22] Filed: July 6, 1976

[30] Foreign Application Priority Data

July 11, 1975 Italy .................................. 25338/75

[51] Int. Cl.² .............................................. F15B 9/10
[52] U.S. Cl. ................................ 91/375 R; 91/391 R; 60/386
[58] Field of Search ................ 91/375 R, 391; 60/386

[56] References Cited

U.S. PATENT DOCUMENTS

| 3,385,057 | 5/1968 | Pruvot et al. | 60/384 |
| 3,452,543 | 7/1969 | Goff et al. | 60/384 |

Primary Examiner—Edgar W. Geoghegan

Attorney, Agent, or Firm—Birch, Stewart, Kolasch & Birch

[57] ABSTRACT

The present invention relates to a control unit for a vehicle powersteering mechanism comprising a housing having an inlet for connection to a source of fluid under pressure, an outlet for returning hydraulic fluid under pressure to said source, a pair of ports for connection to a hydraulic servomotor the movement of which controls the steering of the dirigible wheels of the vehicle, a hydraulic motor provided with a rotatable element and a follower element in operative combination with a distributor valve means provided with at least one displaceable body, said combination being operable on rotation of a control shaft connected thereto to divert hydraulic fluid flowing from said inlet through said housing to said outlet to one of said ports, and thus to its associated chamber of said servomotor, via said hydraulic motor, the hydraulic fluid being exhausted from the other chamber of the servomotor to said outlet, via said other port.

1 Claim, 9 Drawing Figures

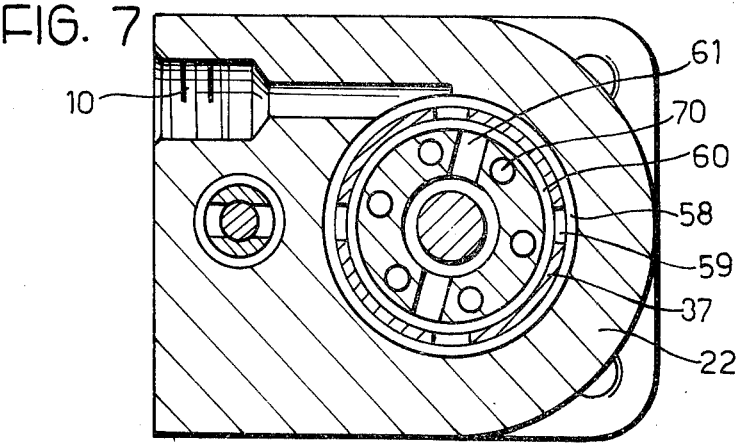
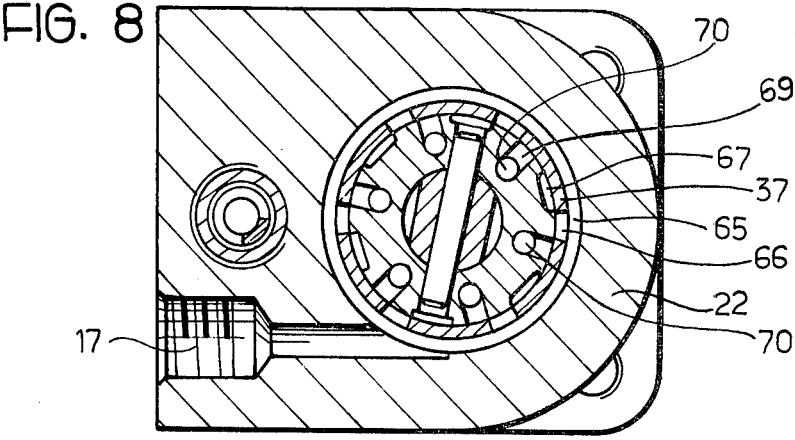
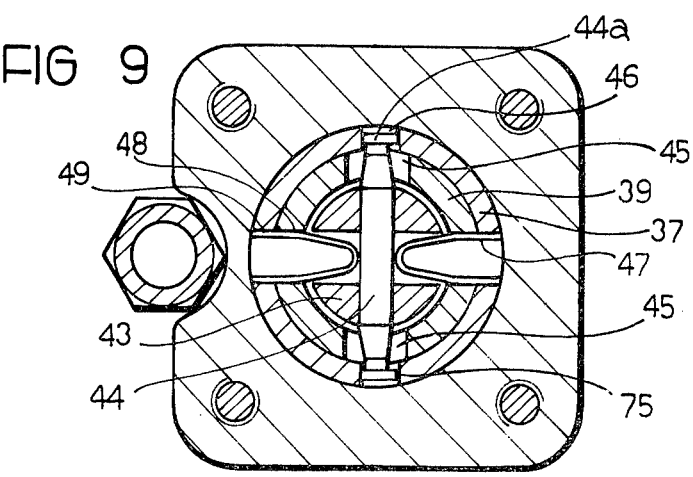

CONTROL UNITS FOR VEHICLE POWERSTEERING MECHANISMS

BACKGROUND OF THE INVENTION

1. Field of the Invention

Particularly although not exclusively, the servomotor may be a double acting hydraulic cylinder. Such control units have the advantage that, if all of the hydraulic fluid used in controlling the steering of the vehicle passes through the motor, the motor is also able to function as a pump in the event the external pump should fail, a valve system is employed to directly connect a suction circuit to the reservoir to maintain sufficient hydraulic fluid in the circuit of the control unit and the servomotor (cylinder) to effect the steering function.

2. Prior Art

Control units as used in the prior art have traditionally employed rotatable distributor valves positioned between the control shaft and the hydraulic motor.

An example of such a prior art mechanism is disclosed in the German Pat. Specification No. 1,293,029.

This known prior art arrangement has the disadvantage of being difficult to achieve a seal between the exterior face of the sleeve of the distributor valve and the adjacent internal face of the housing because of the rotation of the sleeve together with the shaft controlling the hydraulic motor. It has been found in practice that the prior art valve distribution system becomes less responsive with increasing use, resulting in requiring greater wheel turning to achieve the same steering effect, with concomitant vehicle occupant safety problems.

SUMMARY OF THE INVENTION

It is an object of the present invention to provide a control unit for a vehicle powersteering mechanism which minimizes the above disadvantages.

The present invention accordingly provides that the hydraulic motor has the rotatable element directly connected to said control shaft for rotation therewith and the follower element has means for mechanical connection to the displaceable body of said distributor valve means, and means being provided for limiting the displacement of said displaceable body with respect to the stationary part of the distributor valve means.

According to a particular aspect of the present invention the displaceable body of the distributor valve means is angularly displaceable in either direction with respect to the stationary part.

By this arrangement the responsiveness of the valve distribution system is assured, since only a limited displacement is permitted or necessary to effect the diversion of fluid flowing from the inlet to the outlet to one or the other port, via the motor. Further, as the motor is directly connected to the control shaft it is no longer dependent on the efficiency of the valve system and the immediate response to rotation of the steering wheel is assured.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a sectional view taken along line VII—VII of FIG. 3;

FIG. 8 is a sectional view taken along line VIII—VIII of FIG. 3;

FIG. 9 is a sectional view taken along line IX—IX of FIG. 3.

DESCRIPTION OF THE INVENTION

Figure 1:
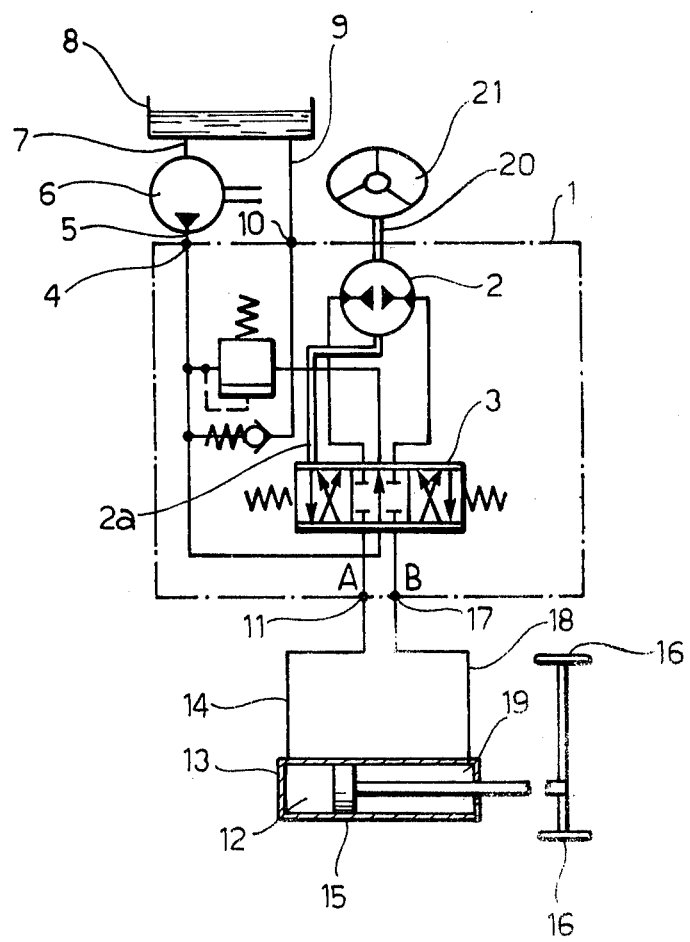
FIG. 1 is a diagrammatic view of a control unit according to the present invention in a vehicle powersteering mechanism.
Figure 2:
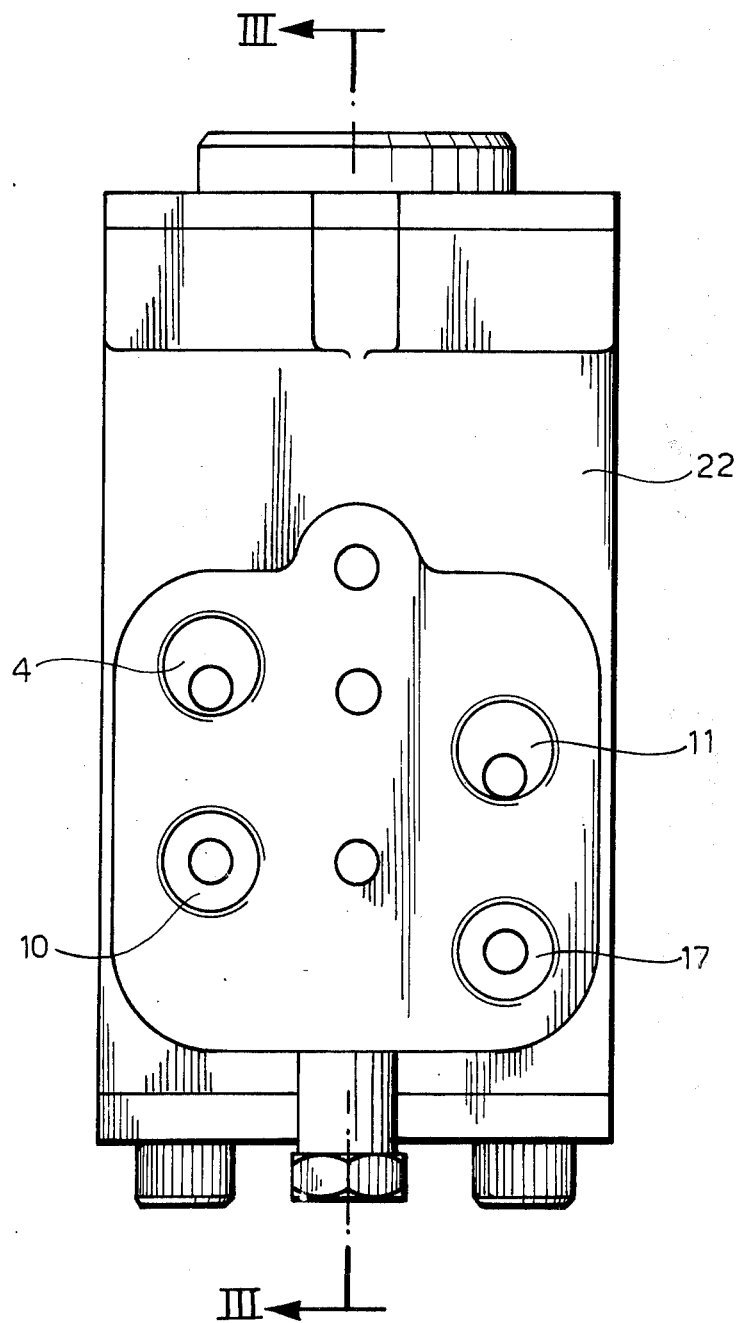
FIG. 2 is a side view of the control unit.
Figure 3:
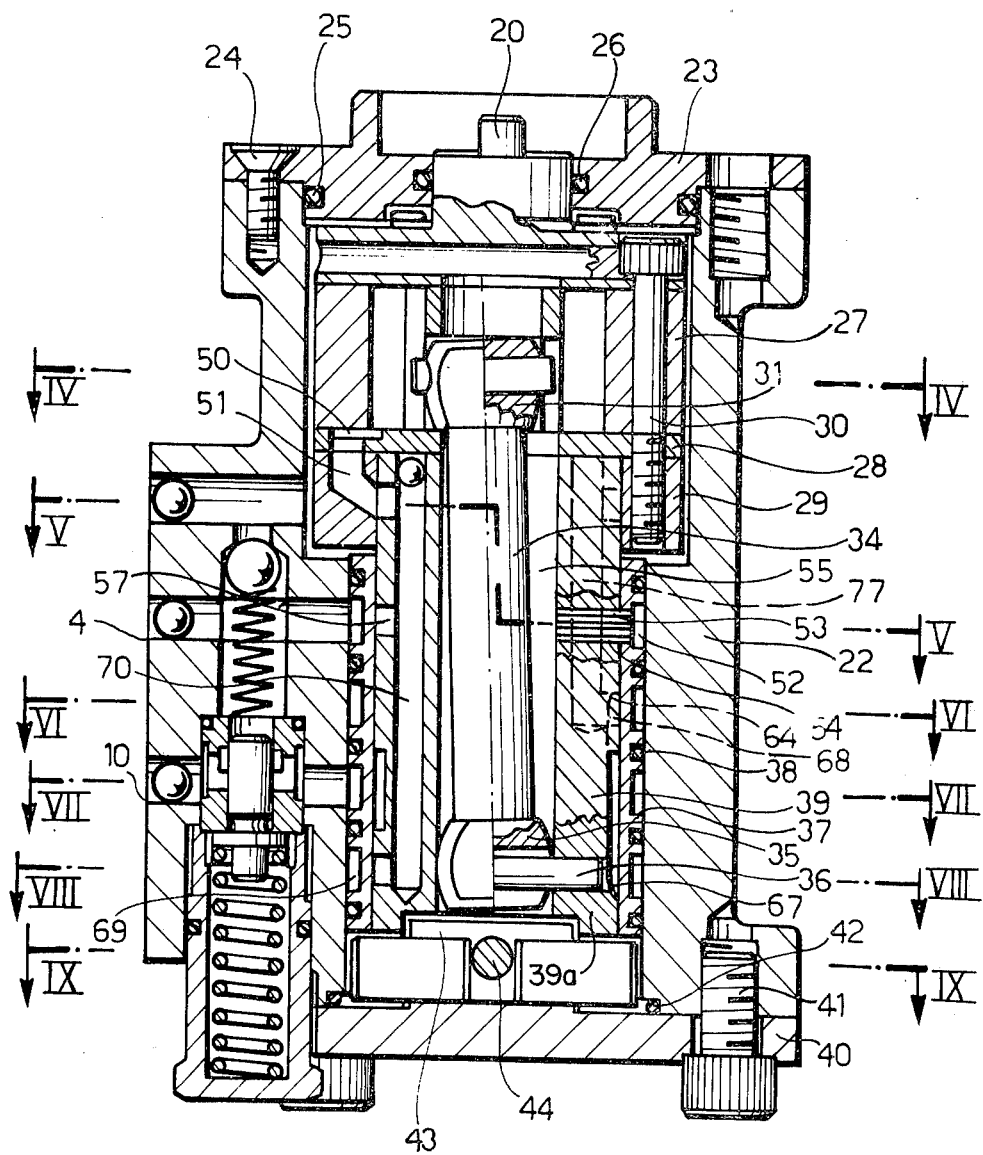
FIG. 3 is a sectional view taken along line III—III of FIG. 2.

Referring to the diagrammatic view of FIG. 1, control unit 1 has the motor 2 mechanically connected, as indicated at 2a, to a distributor 3. An inlet 4 receives fluid via conduit 5 from an auxiliary pump 6 the fluid flowing through the distributor as shown by the arrow, to the outlet 10. Subsequently, the fluid flaws via conduit 9, reservoir 8 and conduit 7, to be recirculated to the pump. This describes the flow path of the fluid when the distributor is in its neutral position, such as when the vehicle is being driven in a straight line.

The rotatable element of motor 2 is directly connected to the control or steering shaft 20 of the driving wheel 21. When the driving wheel 21 is turned, the distributor 3 is displaced by the motor 2 through its linkage 2a to divert fluid entering the unit 1 through the inlet 4 to the motor 2 and thence via either port 11 or 17 and the respective conduit 14 or 18 to the chamber 12 or 19, respectively, of the cylinder 13 (servomotor) which has a double acting piston 15 the movement of which steers the dirigible wheels 16 of the vehicle.

Referring to FIGS 2 – 9, a control unit 1 according to this embodiment comprises a fixed tubular housing 22 having an inlet 4 for connection to the auxiliary pump 6 by means of conduit 5 and an outlet 10 for connection to the hydraulic fluid reservoir 8 by means of conduit 9.

The housing 22 also defines a port 11 comunicating with the chamber 12 of hydaulic cylinder 13 by means of conduit 14 and a port 17 comunicating with the chamber 19 of hydraulic cylinder 13 by means of conduit 18.

The fixed tubular housing 22 is sealingly connected to a top cover plate 23 by means of screws 24 and a sealing ring 25. The cover plate 23 has an axial orifice through which projects the steering or control rod 20, a sealing ring 26 being provided between the cover plate 23 and the rod 20. The control rod 20 is connected to the internally toothed rotatable motor element 27, which is axially rotatable within, the fixed tubular housing 22, to a holed disc 28 and a distributor ring 29, which will be more fully described later, by means of screws 30, whereby the internally toothed element 27, the disc 28 and the distributor ring 29 rotate together.

Figure 4:
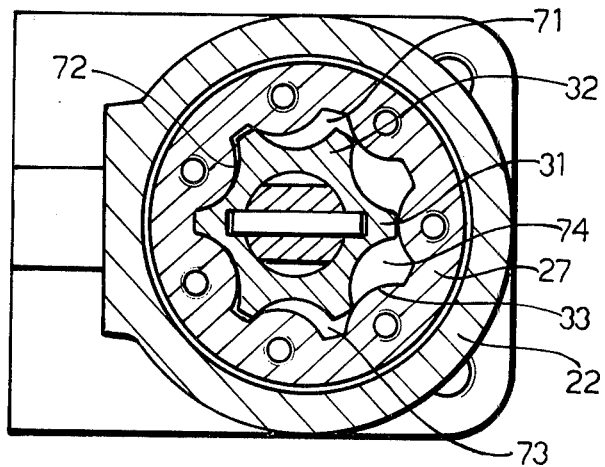
FIG. 4 is a sectional view taken along line IV—IV of FIG. 3.

The externally toothed motor element 31 including the teeth 32, see especially FIG. 4, has one tooth less than the number of teeth 33 of the internally toothed element 27. The externally tooth motor element 31 is located internally of the internally toothed element 27. The externally toothed element 31 has a shaft 34 extending inwardly of the fixed housing 22, the free end of the shaft 34 having a head portion 35 having a laterally projecting pin 36.

In one embodiment of the present invention a fixed sleeve 37, which may be integral with the housing 22, is sealed to the housing 22 by a plurality of sealing rings 38 and mechanically connected to the same by means of a pin 44 which will be described later. Internally of the fixed sleeve 37 there is provided an angularly displaceable distributor sleeve 39, the outer face of which is adjacent the inner face of the sleeve 37. The pin 36 projecting from the head portion 35 is inserted into the body of the sleeve 39, for a purpose to be later described.

A bottom cover plate 40 closes the housing 22 by screw means 41 and a sealing ring 42. A fixed cylindrical extension 43 is provided on the bottom cover plate 40, and receives therein the stepped end 39a of the sleeve 39 (see FIGS. 3 and 9). The pin 44 is inserted in the extension 43 through radially opposite holes 45 provided in the angularly displaceable distributor sleeve 39 and through aligned holes 75 and 46 provided in the fixed sleeve 37. The holes 45 have a diameter greater than the external diameter of the portion of the pin 44 passing therethrough so as to permit slight angular movements of the distributor sleeve 39 relative to the fixed sleeve 37. The diameter of hole 75 is greater than that of hole 46 to permit the pin end 44a to be inserted and subsequently locked in hole 46. A pair of centering springs 47 are provided, as clearly shown in FIG. 9, which extend through apertures 48 and 49 in the sleeve 39 and the fixed sleeve 37, respectively. The apertures 48 and 49 are provided in the sleeve 39 and fixed sleeve 37, respectively, at right angles to the holes 45, 46 and 75, respectively, the springs 47 are designed to abut against the sides of the apertures 48 and 49 to urge the angularly displaceable sleeve 39 into a neutral or central position with respect to the fixed sleeve 37.

The holed disc 28 is provided with a series of circumferentially spaced channels 50 each of which has an upper face which opens into the spaces between the teeth 33 and 32 of the motor elements 27 and 31, respectively in addition, each of said channels 50 include a lower face which opens into a passage 51 in the distributor ring 29, which will be further described below.

Figure 5:
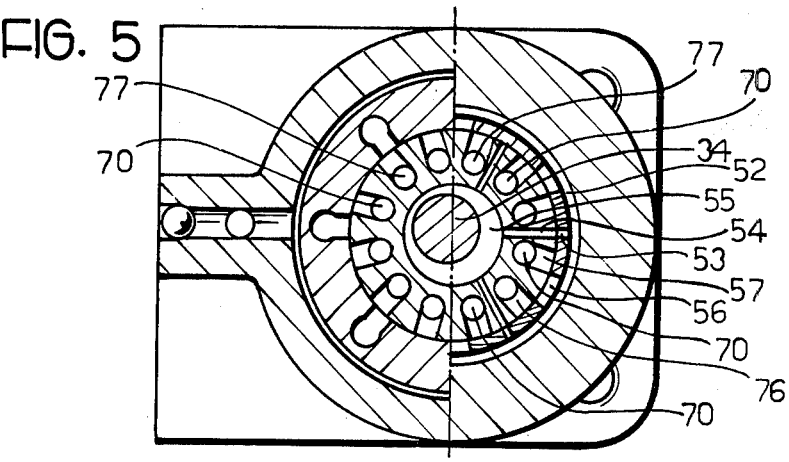
FIG. 5 is a sectional view taken along line V—V of FIG. 3.
Figure 6:
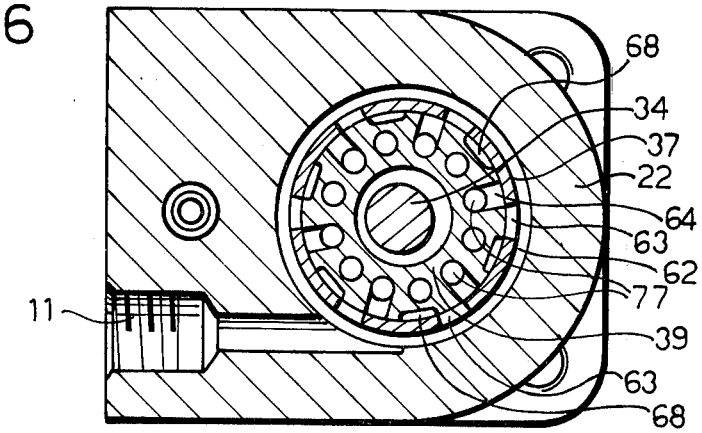
FIG. 6 is a sectional view taken along line VI—VI of FIG. 3.

The inlet 4 communicates with an annular chamber 52 in the fixed sleeve 37 (see especially FIG. 5). A circumferentially spaced series of narrow radially internally projecting conduits 53 extending from said chamber 52 and communicate with a like circumferentially-spaced series of radially extending conduits 54 in the distributor sleeve 39, the conduits 54 open into the central channel 55 of the housing 22. Between each adjacent circumferentially-spaced passage 53 there is a further radially extending passage 56 (see FIG. 5) communicating between the chamber 52 and one of a series of circumferentially-spaced radially opening passages 57 and 76 in the body of the distributor valve sleeve 39.

The outlet 10 communicates with an annular chamber 58 (see especially FIG. 7) in the fixed sleeve 37. A number of circumferentially-spaced radially extending passages 59 in the fixed sleeve 37 communicates between the chamber 58 and an external annular groove 60 provided in the angularly displaceable valve sleeve 39. A pair of radially extending fluid passages 61 communicate between the groove 60 and the central channel 55.

In the neutral or central position of the control unit according to the present invention, the hydraulic fluid, from the auxiliary pump 6 enters inlet 4 and, via chamber 52 and passages 53 in the fixed sleeve 37, and passages 54 in the sleeve 39, which are aligned with the passages 53, flows into the central chamber 55 (see FIG. 5), and from thence, via passage 61 and the annular groove 60 in the sleeve 39, passages 59 and annular chamber 58 in the fixed sleeve 37 (see FIG. 7). Finally, the hydrulic fluid flows into the outlet 10, where it is returned to the reservoir 8 and recirculated via conduit 7 to the auxiliary pump 6.

The port 11 (see FIG. 6) communicates with an annular chamber 62 in the fixed sleeve 37. A number of circumferentially-space radially extending passages 63 communicating with the annular chamber 62 are provided in the fixed sleeve 37 between the circumferentially-spaced radially opening passages 64 and 68 that are provided in the angularly displaceable sleeve 39. The passages 68 can be considered as longitudinal extensions of the annular groove 60 (see FIGS. 3 and 7).

The port 17 (see FIG. 8) communicates with an annular chamber 65 in the fixed sleeve 37. A number of radially extending passages 66 communicating with the annular chamber 65 are provided in the fixed sleeve 37 between the longitudinal groove extensions 67 of the annular groove 60 (see FIGS. 3 and 7) and the circumferentially-spaced radially opening passages 69 provided in the distributor sleeve 39.

The passages 57 and 69 referred to above, each communicate internally of the body of the angularly displaceable sleeve 39 with a series of longitudinally extending passages 70, which communicate at their upper ends with passages 51, in the distributor ring 29.

The passages 76 and 64 referred to above, each communicate internally of the body of the angularly displaceable sleeve 39 with a series of longitudinally extending passages 77 which communicate for fluid distribution at their upper ends with the passages 51 provided in the distributor ring 29. When the steering wheel 21, the control shaft 20, the movable motor element 27, the holed disc 28 and the distributor ring 29 are rotated in one direction, the externally toothed following element 31 is caused to rotate. Thus, by means of the pin 36, connected with the sleeve 39, the sleeve 39 is caused to rotate against the pressure of the springs 47. This closes the communication between passages 53 and 54 and causes the hydraulic fluid coming from the inlet 4 through the passages 56 in the fixed sleeve 37 to be supplied to passages 57 in the displaceable sleeve 39, and thence, via passage 70, in the displaceable sleeve 39, to passages 51 in the distributor ring 29 and to passages 50 in the holed disc 28. It results that the spaces 71 and 72 between the teeth 32 and 33 are caused to expand and spaces 73 and 74 (see FIG. 4) to contract to aid the further rotation of the motor 2. The hydraulic fluid in spaces 73 and 74 is forced via other passages like 50, 51, 77, 64, 63, groove 62 and port 11, in order to increase the volume of chamber 12 of cylinder 13. The hydraulic fluid in chamber 19 is exhausted via port 17, groove 65, grooves 67, 60, passage 59, groove chamber 58 and outlet 10 to the reservoir 8, where it is recirculated to the auxiliary pump 6. Until the steering wheel 21 is rotated in the opposite direction, the sleeve 39 will continue to be in its angularly displaced position against the pressure of springs 47.

When the steering wheel 21 is rotated in the opposite direction, hydraulic fluid will be directed to port 17 and chamber 19 via the motor 2, and exhausted from chamber 12 via port 11 to the inlet, as will be obvious from the drawings and the above description.

In event of failure of the auxiliary pump 6, the power-steering mechanism can be operated directly by means of the steering wheel 21 in a conventional manner, the motor 2 acting as a pump.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A control unit for vehicle powersteering mechanism comprising:
    a housing having an inlet for connection to a source of hydraulic fluid under pressure and an outlet for returning hydraulic fluid to said source;
    a pair of ports for connection to a double chamber hydraulic servomotor the movement of which controls the steering of dirigible wheels of the vehicle;
    a hydraulic motor provided with a rotatable element and a follower element;
    a distributor valve means provided with at least one displaceable body, in the form of a sleeve, angularly displaceable with respect to a neutral position, said distributor valve means being operable on rotation of a control shaft connected thereto to divert hydraulic fluid flowing from said inlet through said housing to said outlet to one of said ports and thus to its associated chamber of said servomotor, via said hydraulic motor, the hydraulic fluid being exhausted from the other chamber of the servomotor to said outlet via said other port;
    means adapted to form a direct connection of said rotatable element of the motor to said control shaft;
    means adapted to form a mechanical connection of said follower element of the motor to the sleeve like displaceable body of said rotatable distributor valve means;
    means adapted to limit the displacement of said sleeve like displaceable body with respect to the stationary part of said distributor valve means, and with respect to said neutral position;
    a plurality of circumferentially spaced longitudinally extending passages provided in said sleeve like displaceable distributor body to feed hydraulic fluid from said inlet, via said motor, to one or the other of said ports when said sleeve like displaceable distributor body is in its displaced position with respect to the neutral position;
    first passages in said housing communicating with said inlet and with said longitudinally extending passages;
    second passages in said housing emanating from each of said ports and communicating with said longitudinally extending passages; and
    radially extending passages in said sleeve like displaceable distributor body communicating with said first passages in said housing, for feeding hydraulic fluid arriving from said inlet to said distributor valve means.

* * * * *

Notice of Adverse Decision in Interference

In Interference No. 100,177, involving Patent No. 4,069,743, B. Bertanza, CONTROL UNITS FOR VEHICLE POWERSTEERING MECHANISMS, final judgment adverse to the patentee was rendered Aug. 13, 1981, as to claim 1.

[*Official Gazette April 6, 1982.*]